(12) United States Patent
Wang

(10) Patent No.: US 6,771,338 B2
(45) Date of Patent: Aug. 3, 2004

(54) TRANSFLECTIVE LIQUID CRYSTAL DISPLAY HAVING TRANSFLECTIVE ELECTRODES OF AN ALUMINUM COMPOUND

(75) Inventor: Cheng Chi Wang, Yungkang (TW)

(73) Assignee: Chi Mei Optoelectronics Corp., Tainan (TW)

( * ) Notice: Subject to any disclaimer, the term of this patent is extended or adjusted under 35 U.S.C. 154(b) by 54 days.

(21) Appl. No.: 09/981,839

(22) Filed: Oct. 19, 2001

(65) Prior Publication Data

US 2003/0076467 A1 Apr. 24, 2003

(30) Foreign Application Priority Data

Jun. 6, 2001 (TW) ........................................ 90113903 A

(51) Int. Cl.[7] ............................................ G02F 1/1335
(52) U.S. Cl. ...................................... 349/114; 349/113
(58) Field of Search ................................. 349/113, 114

(56) References Cited

U.S. PATENT DOCUMENTS 5,990,995 A * 11/1999 Ebihara et al. ............. 349/113
6,211,992 B1 * 4/2001 Van Aerle et al. .......... 359/254
6,384,886 B2 * 5/2002 Yamazaki et al. .......... 349/113
6,456,347 B1 * 9/2002 Motomura et al. ......... 349/117
2001/0048496 A1 * 12/2001 Baek ........................... 349/114
2002/0145688 A1 * 10/2002 Sekiguchi .................... 349/114
2002/0145689 A1 * 10/2002 Kaneko ....................... 349/114

FOREIGN PATENT DOCUMENTS

JP          06-230400 A      *   8/1994

* cited by examiner

Primary Examiner—Tarifur R. Chowdhury

(57) ABSTRACT

A transflective liquid crystal display comprises a top plate comprising a transparent electrode; a bottom plate bonded to the bottom plate, the bottom plate comprising transflective electrodes of aluminum nitride; a liquid crystal layer interposed between the top plate and the bottom plate; and a light source behind the bottom plate. The transflective electrodes reflect incident ambient light and transmit light emitted by the light source. In the liquid crystal display according to the present invention, the transflective electrodes of aluminum nitride replace conventional transparent pixel electrodes such that an image is generated by the transflective liquid crystal display when either ambient light is incident on the surface of the top plate or when light is generated by the light source.

16 Claims, 7 Drawing Sheets

TRANSFLECTIVE LIQUID CRYSTAL DISPLAY HAVING TRANSFLECTIVE ELECTRODES OF AN ALUMINUM COMPOUND

BACKGROUND OF THE INVENTION

1. Field of the Invention

This invention relates to a Liquid Crystal Display (LCD), and more particularly to a LCD of the transflective type.

2. Description of the Related Art

LCDs can be classified based upon the source of illumination. Reflective displays are illuminated by ambient light that enters the display from the front. A reflective surface, such as an aluminum or silver reflector placed behind the LCD assembly, returns light to illuminate the LCD assembly while preserving the polarization orientation of the light incident on the reflective surface. Although reflective displays meet the need for low power consumption, the displays often appear rather dark and are therefore difficult to read. In addition, there are many conditions where there is insufficient ambient light, the purely reflective display is thus limited in usefulness.

In applications where the intensity of ambient light is insufficient for viewing, supplemental lighting, such as a backlight assembly, is used to illuminate the display. The typical backlight assembly includes an optical cavity and a lamp, LED or other structure that generates light. Although supplemental lighting can illuminate a display regardless of ambient lighting conditions, it is an expensive drain on battery life. Thus, the batteries on portable computers, for example, must typically be recharged after 2 to 4 hours of continuous backlight use.

In an attempt to overcome the above described drawbacks of reflective and transmissive displays, some electronic displays have been designed to use ambient light when available and backlighting only when necessary. This dual function of reflection and transmission leads to the designation, "transflective". Transflective LCDs are a dual mode display device. These devices operate either with the available ambient light in a reflective mode or with an internal light source in the transmissive mode.

U.S. Pat. No. 6,211,992, issued on Apr. 3, 2001 to Van Aerle et al., discloses a prior transflective LCD with an electrode of chromium or aluminum that pass light in the transmissive state and reflect ambient light in the reflective state. However, to ensure that sufficient light can be passed in the transmissive state, the electrode must not be thick (in the case of aluminum, for example, thinner than 150 angstroms. It is very difficult to provide such electrodes with sufficient accuracy. Variations in thickness cause large variations in light transmission and, as a result, lead to non-uniform display in both the reflective state and the transmissive state. In the case of relatively large panels, the small thickness additionally influences the drive behavior because the sheet resistance becomes too high.

SUMMARY OF THE INVENTION

Therefore, it is a primary object of the present invention to provide a liquid crystal display with transflective electrodes of aluminum compound such as aluminum nitride which overcomes, or at least reduces the above-mentioned problems of the prior art.

According to a preferred embodiment of the present invention, the liquid crystal display comprises a top plate comprising a transparent electrode; a bottom plate bonded to the top plate, the bottom plate comprising transflective electrodes of aluminum nitride; a liquid crystal layer sandwiched between the top plate and the bottom plate; and a light source behind the bottom plate. The transflective electrodes reflect incident ambient light and transmit light emitted by the light source. In the liquid crystal display according to the present invention, the transflective electrodes of aluminum nitride replace conventional transparent pixel electrodes such that an image is generated by the transflective liquid crystal display when either the ambient light is incident on the surface of the top plate or when the light is generated by the light source.

In the transflective liquid crystal display according to the present invention, sufficient light from a light source (backlight) can pass through the transflective electrodes of aluminum nitride, while, on the other hand, the transflective electrode still has such a thickness (for example approximately 250 angstroms) that thickness variations caused by process variations do not influence the uniformity of the display. Further, the sheet resistance decreases considerably, thereby enhancing the drive behavior.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 1:
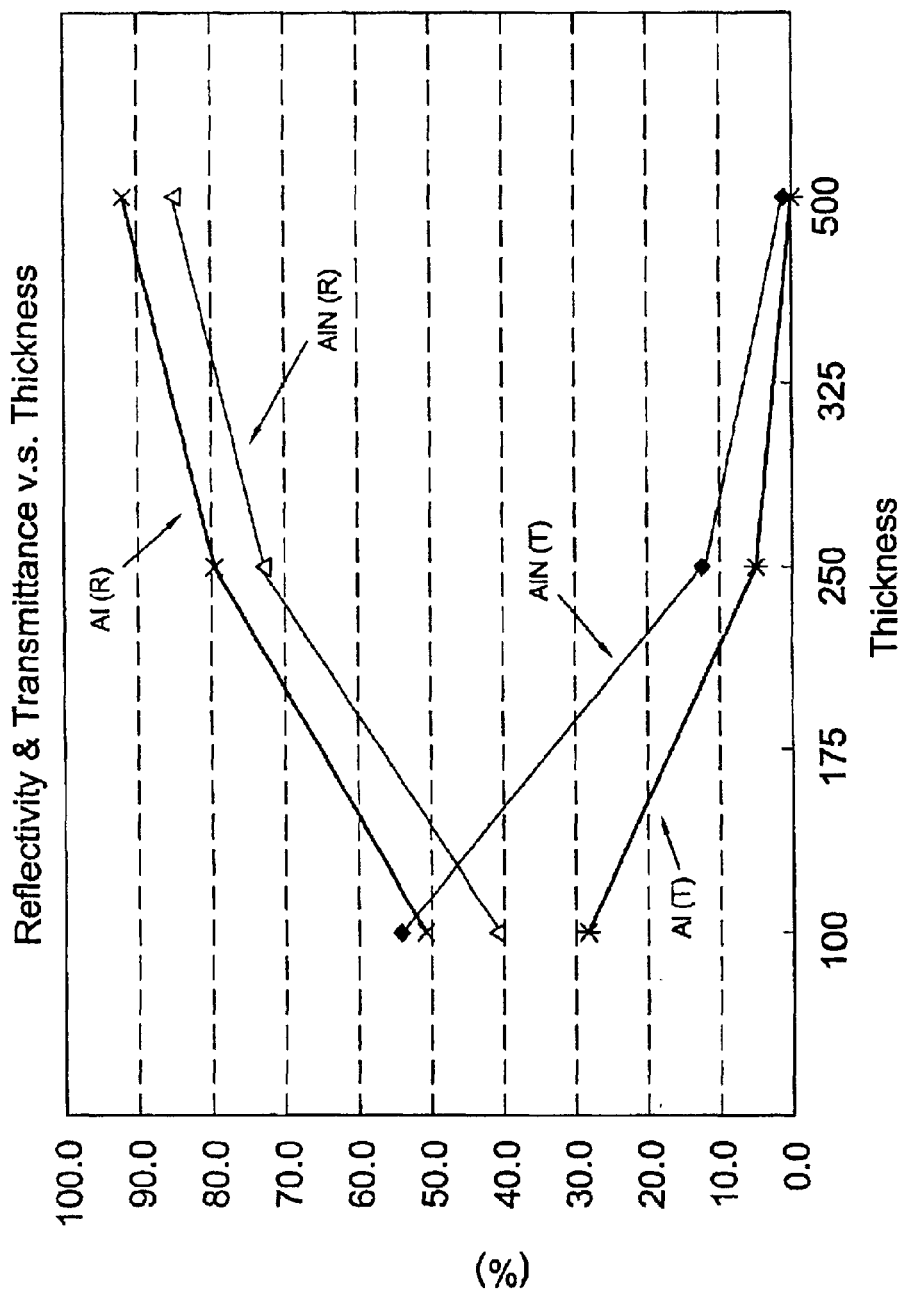
FIG. 1 is a graph showing a relation between a transmittance or a reflectivity to a thickness of AlN or Al film.
Figure 2:
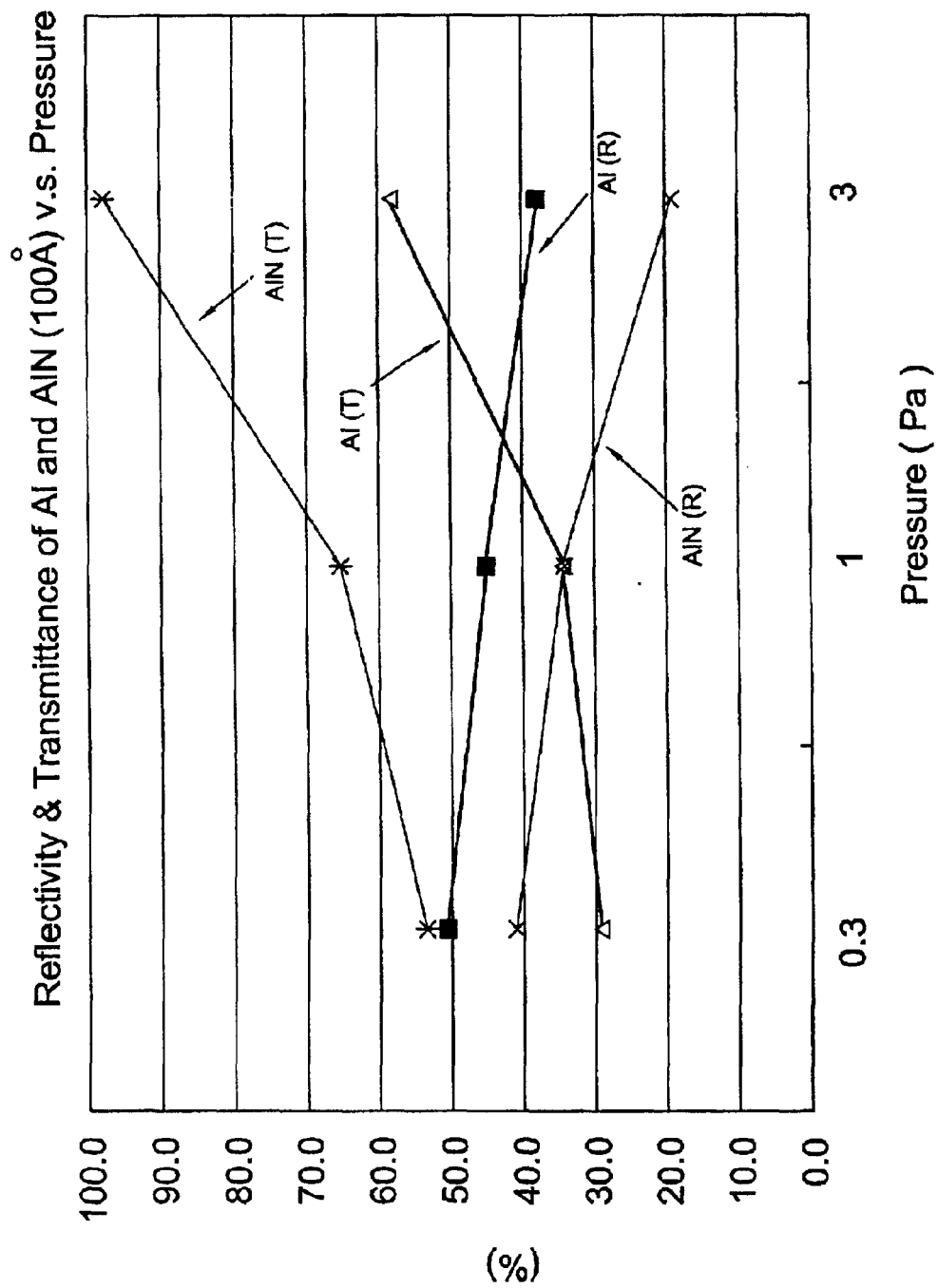
FIG. 2 is a graph showing a relation between a reflectivity & a transmittance of Al or AlN film (with a thickness of 100 angstroms) to a film forming pressure.
Figure 3:
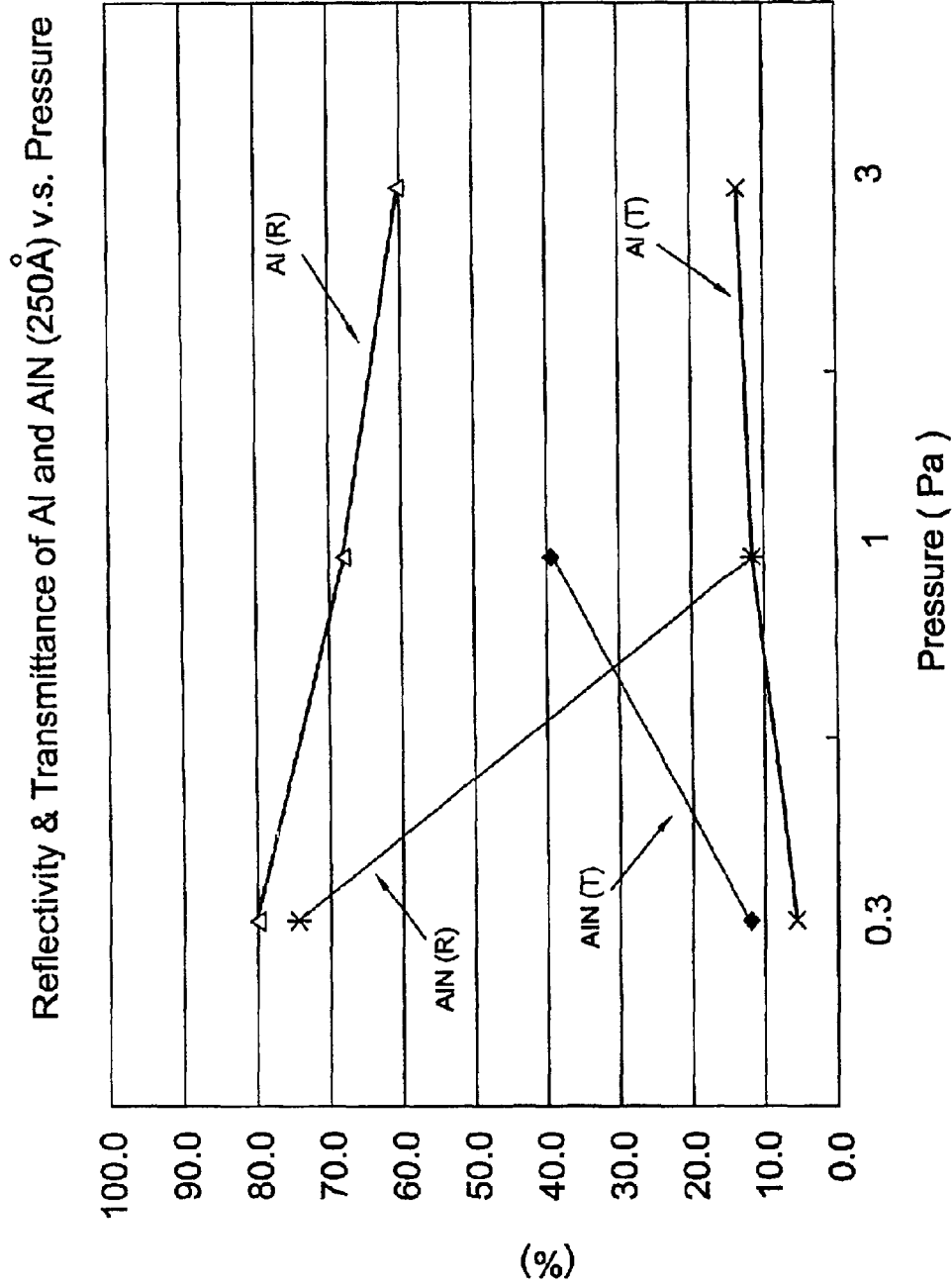
FIG. 3 is a graph showing a relation between a reflectivity & a transmittance of Al or AlN film (with a thickness of 250 angstroms) to a film forming pressure.
Figure 4:
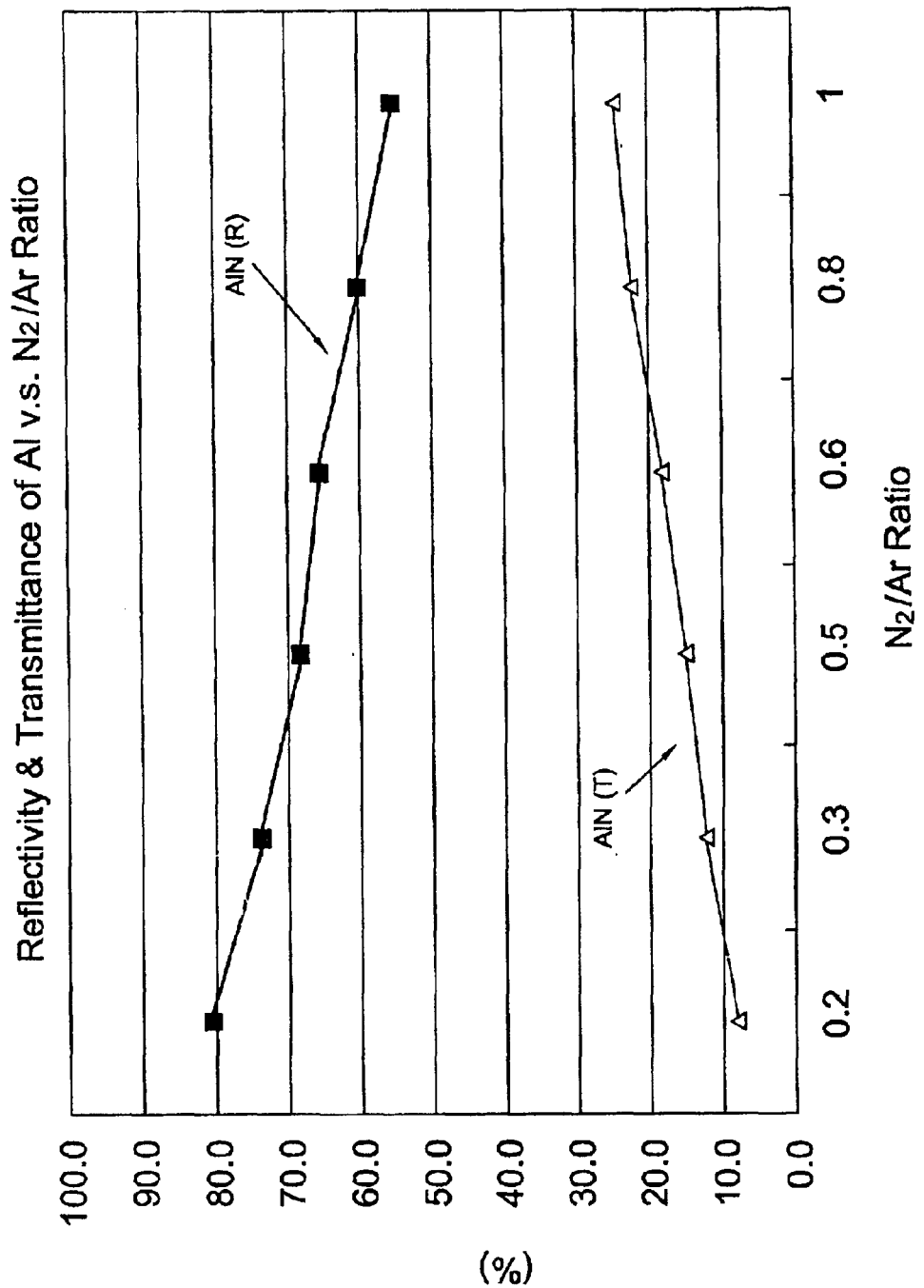
FIG. 4 is a graph showing a relation between a reflectivity & a transmittance of AlN film to a $N_2/Ar$ ratio.

As to the problem occurred in conventional LCDs of the transflective type as described above, the inventor has found during researches that aluminum compound such as aluminum nitride (AlN) can replace chromium or aluminum as the transflective electrodes. The inventor has investigated a relation between the transmittance/reflectivity to the thickness of AlN and Al film, and the result is shown in FIG. 1. The graph of FIG. 1 shows that the transmittance of AlN film is higher than Al film with the same thickness when the film thickness is 500 angstroms or less. Furthermore, the transmittance curve and the reflectivity curve of AlN film intersect at a point corresponding to a film thickness more than 100 angstroms. By contrast, the transmittance curve and the reflectivity curve of Al film extrapolate to intersect at a point corresponding to a film thickness less than 100 angstroms. Therefore, compared with Al, AlN can be used with a wider process window, and thus AlN is more suitable for mass production. Then, the inventor has investigated, when Al or AlN is deposited by sputtering to a thickness of 100 angstroms, a relation between the reflectivity/transmittance of Al or AlN film to the film forming pressure in the sputtering process, and the result is shown in FIG. 2. The graph of FIG. 2 shows that the transmittance of AlN film is 30% higher than the transmittance of Al film, and the reflectivity of AlN film is a little less than the reflectivity of Al film by 10%. Therefore, AlN film is a better choice for a LCD design emphasized with high transmittance. Further, the inventor has investigated, when Al or AlN is deposited by sputtering to a film thickness of 250 angstroms, a relation between the reflectivity/transmittance of Al or AlN film to the film forming pressure in the sputtering process, and the result is shown in FIG. 3. The graph of FIG. 3 shows that the reflectivity curve and the transmittance curve of AlN film intersect at a point corresponding to a film thickness within the typical sputtering pressure, i.e., between 0.3 Pa and 1 Pa. Therefore, the sputtering process of AlN film can be easily conducted. By contrast, when the sputtering pressure is set to a value of about 0.3 to about 1 Pa, the Al film has a maximum transmittance of only 10%. Besides, the inventor has investigated, when AlN film is formed by sputtering, a relation between the transmittance/reflectivity of AlN film and the $N^2/Ar$ ratio in the sputtering process, and the result is shown in FIG. 4. The graph of FIG. 4 shows that, by adjusting the $N^2/Ar$ ratio, we can obtain an AlN film with a specific transmittance/reflectivity to meet the design requirement of product. Typically, the average transmission of transflective electrodes over the visible spectrum is desirably not less than 10% to ensure that sufficient light can be passed.

Figure 5:
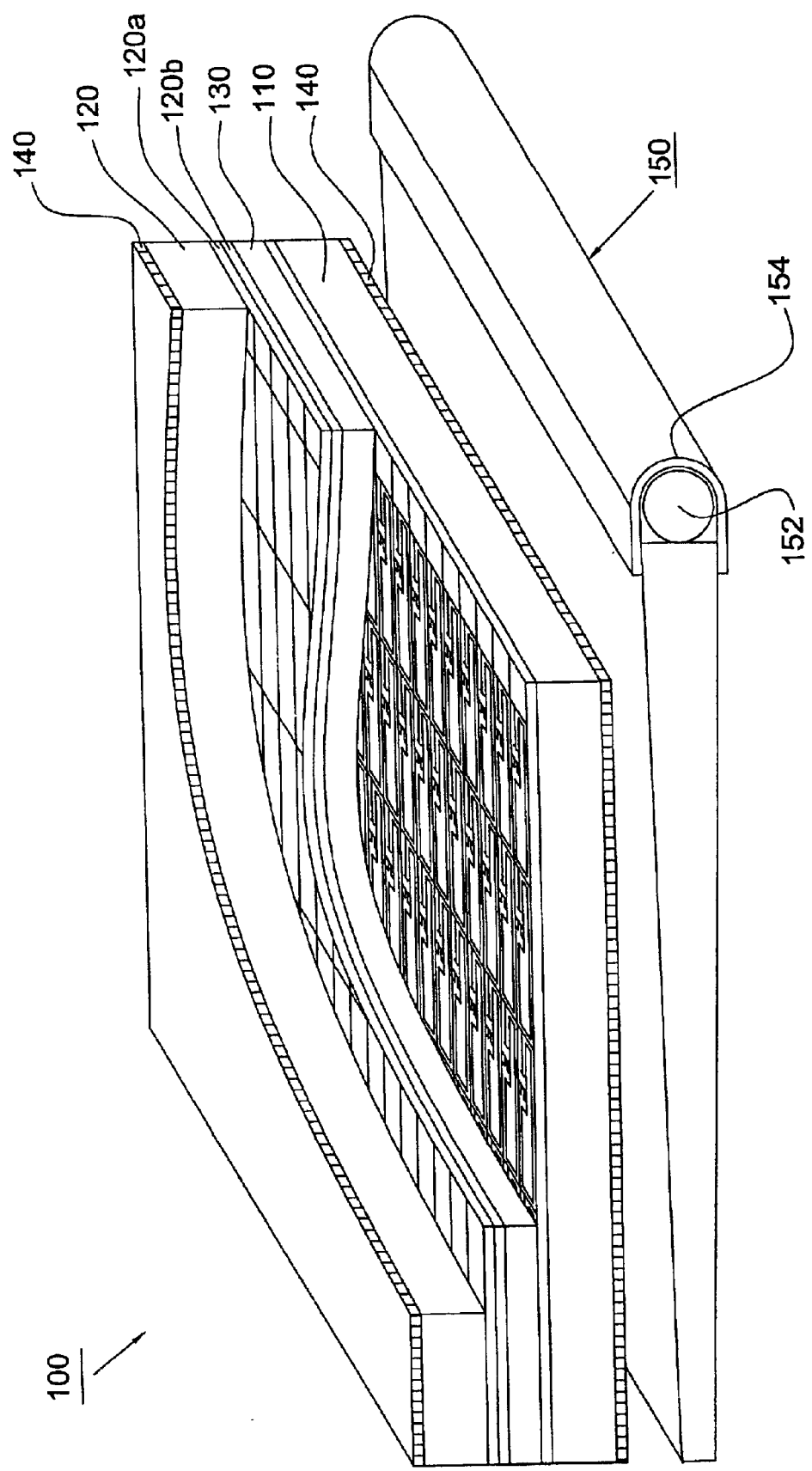
FIG. 5 is a cross sectional view of a portion of a transflective LCD according to a preferred embodiment of the present invention.

FIG. 5 is a cross sectional view of a portion of a transflective LCD according to a preferred embodiment of the present invention. The transflective LCD mainly comprises a liquid crystal panel including a bottom plate 110, a top plate 120 bonded to the bottom plate 110 and a liquid crystal 130 filled between the top and bottom plates. Typically, the bottom plate 130 is provided with a plurality of pixel regions arranged as a matrix, and the top plate 120 is provided with a color filter 120a for displaying colors and a transparent electrode 120b such as an ITO electrode as a common electrode. Polarizing plates 140, which polarize visible light, are respectively attached to the surfaces of the top and bottom plates. A light source such as a backlight module 150 is provided behind the polarizer 140 on the bottom plate 130. The backlight module 150 typically includes a lamp such as a fluorescent tube 152 contained within a tubular housing 154 that has an inner mirrored surface. Light generated from the fluorescent tube 152 enters the backlight module 150, and is reflected into the liquid crystal layer.

Figure 6:
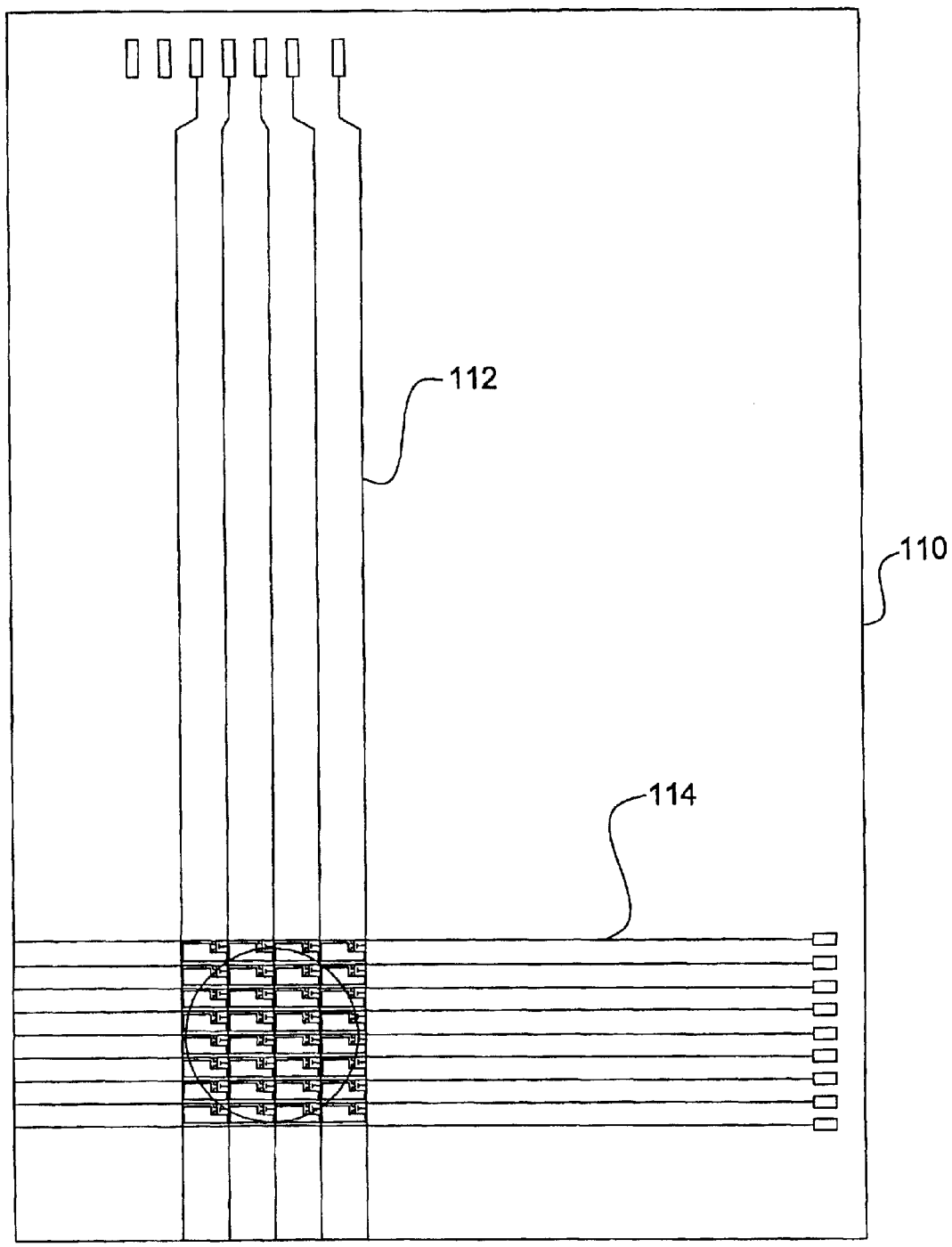
FIG. 6 is a top plan view of a bottom plate of the LCD shown in FIG. 5 according to the present invention.
Figure 7:
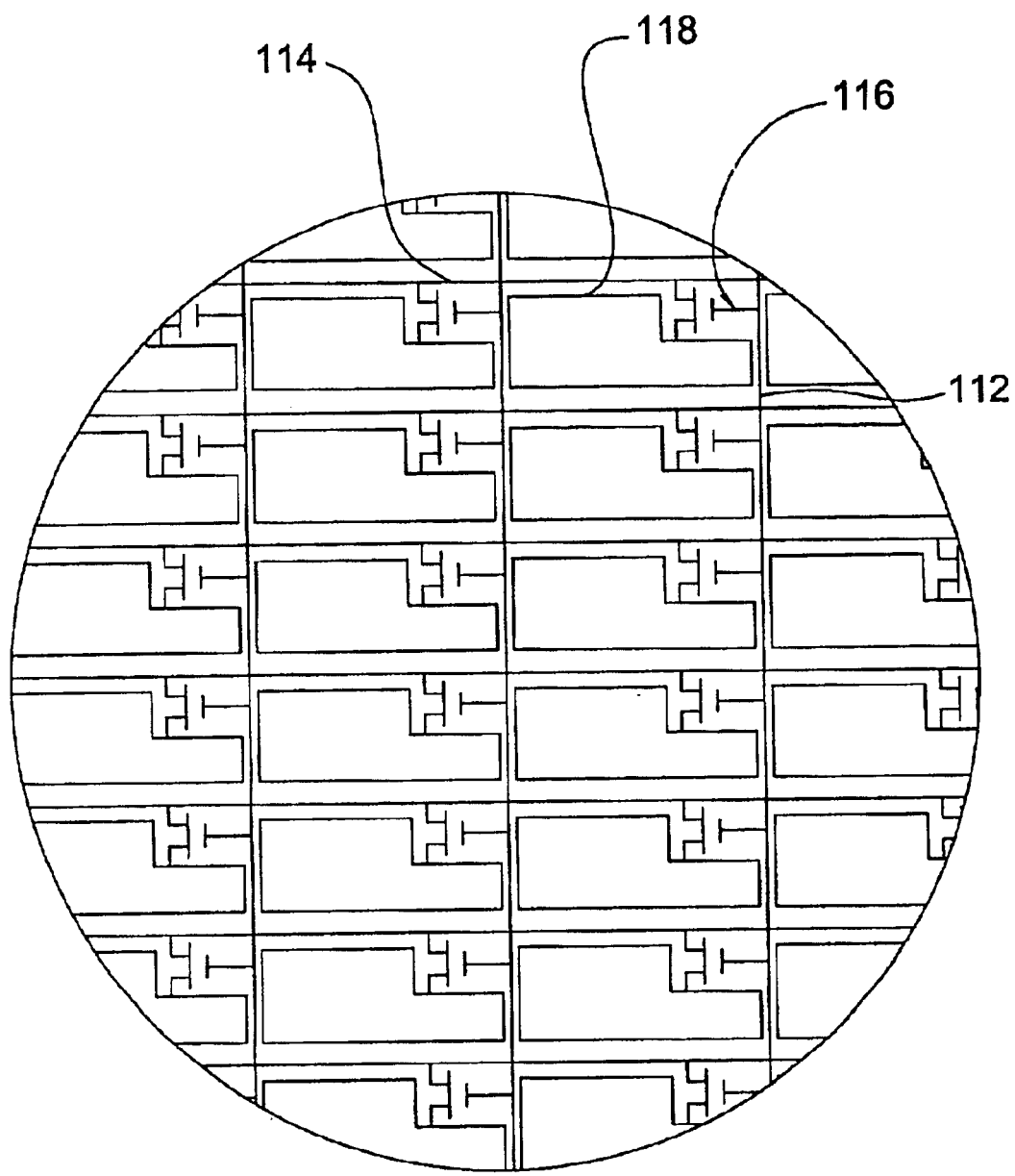
FIG. 7 shows a portion I of FIG. 6 according to the present invention on an enlarged scale.

FIG. 6 is a top plan view of the bottom plate 110 of the LCD according to the present invention. On the central region of the bottom plate 110, there are formed a plurality of parallel scan lines 112 and a plurality of parallel data lines 114 perpendicular to the scan lines 112. The pixel region described above is a region which is surrounded by two adjacent scan lines 112 and two adjacent data lines 114. Although not shown, these scan lines 112 and data lines 114 are insulated from each other through an inter-layer insulating film. Moreover, the display region is constructed of the region in which the scan lines 112 and the data lines 114 intersect, and the pixel region is a region which is surrounded by the two adjacent scan lines 112 and the two adjacent data lines 114. Specifically, in each pixel region, as shown in FIG. 7, there are formed a thin film transistor (TFT) 116 as the switching element, and a transflective electrode 118 as a pixel electrode. When the scanning signal is fed to the scan line, the thin film transistor is turned on to feed the video signal therethrough to the pixel electrode.

It is noted that the present invention is characterized in that the transflective electrode 118 is made of AlN such that the transflective electrode 118 passes light in the transmissive state and reflects ambient light in the reflective state. Accordingly, an image is generated by the transflective LCD according to the present invention when either ambient light is incident on the surface of the top plate or when light is generated by the light source. According to the present invention, the transflective electrode 118 is formed from a thin film of AlN deposited with a sputter power of from about 10 to about 40 Kilowatts with a film forming pressure of about 0.3 to about 1 Pa. Typically, the AlN film is deposited by chemical vapor deposition (CVD) or sputtering. According to the present invention, the AlN film is preferably deposited by sputtering a target substrate of aluminum in a vacuum chamber using nitrogen gas plasma as reactive gas and using argon as inert sputter gas. The pixel electrode must be thin enough to allow sufficient light to pass in the transmissive state; moreover, the pixel electrode must be thick enough thereby assuring a sufficient accuracy of the electrode thickness. Therefore, the thickness of the AlN film is chosen preferably in the range of about 100 to about 400 angstroms, more preferably in the range of about 200 to about 300 angstroms, and most preferably to be about 250 angstroms. Then, a photoresist layer is applied on the surface of the AlN film, and a pattern of pixel electrodes is transferred by photolithography. Finally, the unprotected portions of the AlN film are removed to form corresponding transflective electrodes 118.

In the transflective LCD according to the present invention, by providing the transflective electrodes of aluminum nitride to replace conventional transparent pixel electrodes, the AlN electrodes have such a thickness (for example approximately 250 angstroms) that thickness variations caused by process variations do not influence the uniformity of the display, while, on the other hand, the AlN electrodes still allow sufficient light from a light source (backlight) to pass. Further, this causes the sheet resistance to decrease considerably thereby enhancing the drive behavior.

Although the invention has been explained in relation to its preferred embodiment, it is to be understood that many other possible modifications and variations can be made without departing from the spirit and scope of the invention as hereinafter claimed.

What is claimed is:

1. A transflective liquid crystal display, comprising:
   a top plate comprising a transparent electrode;
   a bottom plate comprising transflective electrodes of aluminum compound;
   a liquid crystal layer sandwiched between the top plate and the bottom plate; and
   a light source behind the bottom plate,
   wherein an image is generated by the transflective liquid crystal display when either ambient light is incident on the surface of the top plate or when light is generated by the light source.

2. The transflective liquid crystal display as claimed in claim 1, wherein the bottom plate further comprises:
   a plurality of parallel scan lines;
   a plurality of parallel data lines formed perpendicular to the scan lines, the scan lines and the data lines being arranged to form a matrix of pixel regions with each of the pixel regions bounded by two adjacent scan lines and two adjacent data lines; and a plurality of thin film transistors formed at intersections between the scan lines and data lines, wherein each of the transflective electrodes is respectively disposed in one of the pixel regions and functions as a pixel electrode.

3. The transflective liquid crystal display as claimed in claim 2, wherein the transflective electrodes have a visible light transmittance of not less than 10%.

4. The transflective liquid crystal display as claimed in claim 3, wherein the transflective electrodes have a thickness in the range of about 100 to about 400 angstroms.

5. The transflective liquid crystal display as claimed in claim 4, wherein the transflective electrodes have a thickness in the range of about 200 to about 300 angstroms.

6. The transflective liquid crystal display as claimed in claim 5, wherein the transflective electrodes have a thickness of about 250 angstroms.

7. The transflective liquid crystal display as claimed in claim 1, wherein the transflective electrodes are formed from a thin film of aluminum nitride deposited with a sputter power of from about 10 to about 40 Kilowatts with a film forming pressure of about 0.3 to about 1 Pa.

8. The transflective liquid crystal display as claimed in claim 1, wherein the aluminum compound includes aluminum nitride.

9. A transflective liquid crystal panel, comprising:

a top plate comprising a transparent electrode;

a bottom plate comprising transflective electrodes of aluminum compound; and a liquid crystal layer sandwiched between the top plate and the bottom plate, wherein an image is generated by the transflective liquid crystal display panel when light is incident on the surface of the top plate or the bottom plate.

10. The transflective liquid crystal panel as claimed in claim 9, wherein the aluminum compound includes aluminum nitride.

11. The transflective liquid crystal panel as claimed in claim 9, wherein the bottom plate further comprises:

a plurality of parallel scan lines;

a plurality of parallel data lines formed perpendicular to the scan lines, the scan lines and the data lines being arranged to form a matrix of pixel regions with each of the pixel regions bounded by two adjacent scan lines and two adjacent data lines; and a plurality of thin film transistors formed at intersections between the scan lines and data lines, wherein each of the transflective electrodes is respectively disposed in one of the pixel regions and functions as a pixel electrode.

12. The transflective liquid crystal panel as claimed in claim 11, wherein the transflective electrodes have a visible light transmittance of not less than 10%.

13. The transflective liquid crystal panel as claimed in claim 12, wherein the transflective electrodes have a thickness in the range of about 100 to about 400 angstroms.

14. The transflective liquid crystal panel as claimed in claim 13, wherein the transflective electrodes have a thickness in the range of about 200 to about 300 angstroms.

15. The transflective liquid crystal panel as claimed in claim 9, wherein the transflective electrodes have a thickness of about 250 angstroms.

16. The transflective liquid crystal panel as claimed in claim 9, wherein the transflective electrodes are formed from a thin film of aluminum nitride deposited with a sputter power of from about 10 to about 40 Kilowatts with a film forming pressure of about 0.3 to about 1 Pa.

* * * * *